United States Patent Office 2,814,612
Patented Nov. 26, 1957

2,814,612

UREA ADDUCTS

Dennis Henry Desty and Charles Leslie Arthur Harbourn, London, England, assignors to The British Petroleum Company Limited No Drawing. Application December 2, 1953,
Serial No. 395,835

Claims priority, application Great Britain
December 31, 1952

8 Claims. (Cl. 260—96.5)

This invention relates to a process for the production of non-ionic surface active agents in solid form.

Our copending United States patent application Serial No. 206,518 describes a process which comprises stirring a liquid non-ionic surface active agent comprising a compound having, in the molecule, a chain of condensed ethylene oxide groups, with an excess by weight of urea in the presence of a hydrocarbon reaction diluent, in which urea and the reaction product of urea and said liquid non-ionic surface active agent are insoluble, whereby the reaction mixture takes the form of a slurry, and thereafter separating and recovering the solid phase of the reaction product, said phase comprising the solid non-ionic surface active addition product.

It is an object of the present invention to provide a process for the production of solid non-ionic surface active agents which are light in colour. Other objects will appear hereinafter.

According to the present invention, there is provided a process which comprises treating a liquid non-ionic surface active agent with sulphur dioxide and, thereafter mixing the treated agent with an excess by weight of solid urea, in the presence of a reaction diluent and a reaction activator, maintaining the mixture until urea adduct formation has taken place and separating the solid product.

Usually the sulphur dioxide treatment is effected by contacting the liquid non-ionic surface active agent with gaseous sulphur dioxide. Preferably sulphur dioxide gas is bubbled through the liquid non-ionic surface active agent until said agent is saturated with the gas.

Suitable reactor diluents are hydrocarbons or hydrocarbon mixtures in which the reactants and products are substantially insoluble and which do not, themselves, form adducts with urea under the reaction conditions. Preferably the diluent is a hydrocarbon containing five or six carbon atoms/molecule. Suitable diluents are, for example, n-pentane, iso-pentane, n-hexane, iso-hexane, cyclopentane, cyclohexane, and petroleum ether fractions boiling in the range 40–150° C. which have a low concentration of hydrocarbons which react with urea or which are free of said hydrocarbons.

In general the reaction activators have some solvent action upon urea. Suitable reaction activators include water; low molecular weight alcohols, for example, methanol, ethanol and glycerol; and ketones for example, acetone and methyl ethyl ketone.

Preferably the activator constitutes up to 20% by volume, based on the volume of reaction diluent employed. More particularly the proportion of activator constitutes 1%–5% by volume, based on the volume of reaction diluent.

Preferred non-ionic surface active agents contain a chain of condensed ethylene oxide units. The surface active agents include foaming agents, dispersing agents, wetting agents, emulsifying agents, solutizers and detergents.

Examples of these include the following:

(a) Products from fatty and resin acids comprising compounds of the general type $$R\text{—}COO\text{—}(CH_2CH_2O)_n\text{—}CH_2CH_2\text{—}OH$$

where R is a long chain alkyl group, preferably having 5–50 carbon atoms and $n$ is an integer, preferably in the range 5–50.

Commercial examples of these are the products "Ethofat 242/20" made by the Armour Corporation by reacting 1 mol. of "70% rosin fatty acids" with 10 mol. of ethylene oxide.

"Ethofat 242/25" made by the Armour Corporation by reacting 1 mol. of "70% rosin fatty acids" with 15 mols. of ethylene oxide.

"Soromin SG," which is a stearylpolyglycoether, the chain of ethylene oxide groups being on average 6 units in length.

"Renex" made by the Atlas Powder Company by reacting tall oil with ethylene oxide.

(b) Products from alcohols, comprising compounds of the general type:

$$R\text{—}O\text{—}(CH_2CH_2O)_n\text{—}CH_2CH_2\text{—}OH$$

where R is a long chain alkyl group preferably having 5–50 carbon atoms and $n$ is an integer, preferably in the range 5–50.

Commercial examples of these compounds are the products:

"Aeto PC6" which is an alcoholic material of average chain length 15 and a hydroxyl number of 247 condensed with 6 mol. of ethylene oxide.

"Aeto PC12" which is an alcoholic material of average chain length 15 and a hydroxyl number of 247 condensed with 12 mol. of ethylene oxide. "Brig 30," which is a condensation product of ethylene oxide with lauryl alcohol.

(c) Products from alkylated phenols comprising compounds of the general type $$R\text{—}A\text{—}O\text{—}(CH_2CH_2\text{—}O)_n\text{—}CH_2\text{—}CH_2\text{—}OH$$

where R is a long chain alkyl group preferably of 8–12 carbon atoms, A is an aromatic group and $n$ is an integer, preferably in the range 5–50.

Commercial examples of these are the products:

"Lissapol N" and "Lissapol NXA," in which R is an alkyl group having on average 8 carbon atoms, A is a benzene ring and in which the value of $n$ is approximately 12.

"Igepal C extra conc.," which is a condensate of 1 mol. of dodecyl phenol with 12 mol. of ethylene oxide.

"Antarox A200" similar in composition to "Igepal C extra conc."

(d) Products from mercaptans of the general type $$R\text{—}S\text{—}(CH_2CH_2\text{—}O)_n\text{—}CH_2CH_2\text{—}OH$$

where R is a long chain alkyl group preferably of 10–14 carbon atoms and $n$ is an integer, preferably in the range 5–50.

A commercial example is the American product "Nonic 218" made by Sharples Chemicals Inc., and which is a condensate of ethylene oxide with tertiary dodecyl mercaptan.

Usually the non-ionic surface active agent is reacted with urea in a ratio in the range 1:1 to 1:5 and preferably in the range 1:1 to 1:2 by weight.

Although water may be present in the mixture of non-ionic surface active agent and urea undergoing reaction, it is in general not desirable that it should be present in excess of 25% by weight of the surface active agent employed.

In general it will be found convenient to carry out the reaction of non-ionic surface active agent and urea compound at a temperature within the range 0–80° C. Preferably the temperature is maintained within the range 15–45° C.

When treating highly coloured surface active agents according to the process of the invention there is, in general, an improvement in colour both in the treated surface active agent and in the adduct formed by reacting the surface active agent with urea.

The term "urea" as employed throughout this specification includes biuret and mixtures of biuret and urea within its scope.

A preferred feedstock for use in the process of the invention is described in the specification in respect of our copending British patent application No. 33050/52.

The invention is illustrated but in no way limited with reference to the following example. By way of comparison there is provided details of an experiment in which the surface active agent was reacted with urea without pre-treatment with sulphur dioxide—

*Example*

Ten grams of "Lissapol NXA" was saturated, at 40° C., with gaseous sulphur dioxide. The treated material was mixed with 100 ml. of normal pentane and 1 ml. of ethanol and thereafter 20 grams of urea added. The mixture was stirred for 1 hour, allowed to stand for 48 hours and then filtered.

The solid product obtained after evaporation of residual solvent, was a very light cream-coloured free-flowing powder of pleasing appearance.

*Experiment*

The method described in the above example was repeated, omitting the sulphur dioxide pre-treatment. The product obtained, after evaporation of residual solvent, was a dark brown, slightly tacky powder.

We claim:

1. A process for the production of solid non-ionic surface active agents, which comprises mixing with sulphur dioxide a liquid non-ionic surface active agent selected from the group consisting of compounds having the formula $R\text{—}COO\text{—}(CH_2CH_2O)_n\text{—}CH_2\text{—}CH_2\text{—}OH$ where R is a long chain alkyl group containing from 5 to 50 carbon atoms and $n$ is an integer in the range of 5 to 50, compounds having the formula $$R\text{—}O\text{—}(CH_2CH_2O)_n\text{—}CH_2CH_2\text{—}OH$$

where R is a long chain alkyl group containing from 5 to 50 carbon atoms and $n$ is an integer in the range of 5 to 50, compounds having the formula $$R\text{—}A\text{—}O(CH_2CH_2O)_n\text{—}CH_2CH_2\text{—}OH$$

where R is a long chain alkyl group containing from 8 to 12 carbon atoms, A is an aromatic group and $n$ is an integer in the range of 5 to 50 and compounds having the formula $$R\text{—}S\text{—}(CH_2CH_2\text{—}O)_n\text{—}CH_2CH_2\text{—}OH$$

where R is a long chain alkyl group containing from 10 to 14 carbon atoms and $n$ is an integer in the range of 5 to 50 carbon atoms, thereafter mixing the treated agent with a mixture of solid urea, a reaction diluent and a reaction activator, the surface active agent and urea being in a ratio in the range 1:1 to 1:5 parts by weight, maintaining the mixture until urea adduct formation has taken place and separating the solid product.

2. A process as specified in claim 1 in which sulphur dioxide gas is passed through the surface active agent until said agent is saturated with the gas.

3. A process as specified in claim 2 in which the reaction diluent is a hydrocarbon having 5–6 carbon atoms in the molecule and which does not form an adduct with urea.

4. A process as specified in claim 2 in which the reaction diluent is a petroleum ether fraction boiling in the range 40–150° C. and which contains at most, only a small proportion of hydrocarbons which react with urea.

5. A process as specified in claim 2 in which the reaction activator is a hydroxy-group containing material selected from the group consisting of alcohols having 1–3 carbon atoms/molecule, water and mixtures of at least two of these compounds.

6. A process as specified in claim 2 in which, in the mixing zone, the liquid non-ionic surface active agent is mixed with urea in a ratio up to 1:5 parts by weight.

7. A process as specified in claim 5 in which, in the mixing zone, the reaction reactivator constitutes up to 20% by volume of the reaction diluent present.

8. A process as specified in claim 6 in which the agent is mixed with urea in a ratio up to 1:2 parts by weight.

References Cited in the file of this patent

UNITED STATES PATENTS

| | | |
|---|---|---|
| 1,370,824 | Ladd | Mar. 8, 1921 |
| 2,053,439 | Nitardy | Sept. 8, 1936 |
| 2,559,583 | Barker | July 10, 1951 |
| 2,588,602 | Adams et al. | Mar. 11, 1952 |
| 2,665,256 | Barker | Jan. 5, 1954 |
| 2,673,195 | Busso et al. | Mar. 23, 1954 |
| 2,700,036 | Bradley et al. | Jan. 18, 1955 |
| 2,702,289 | Bowman et al. | Feb. 15, 1955 |

FOREIGN PATENTS

| | | |
|---|---|---|
| 683,383 | Great Britain | Nov. 26, 1952 |

U. S. DEPARTMENT OF COMMERCE
PATENT OFFICE

CERTIFICATE OF CORRECTION

Patent No. 2,814,612                  November 26, 1957

Dennis Henry Desty et al.

It is hereby certified that error appears in the printed specification of the above numbered patent requiring correction and that the said Letters Patent should read as corrected below.

Column 3, line 25, for "ethanol" read --methanol--.

Signed and sealed this 15th day of April 1958.

(SEAL)
Attest:
KARL H. AXLINE
Attesting Officer

ROBERT C. WATSON
Commissioner of Patents